April 21, 1925.
W. F. SCHUMER
1,535,048
CHUCKING MECHANISM
Filed April 16, 1923
2 Sheets-Sheet 1
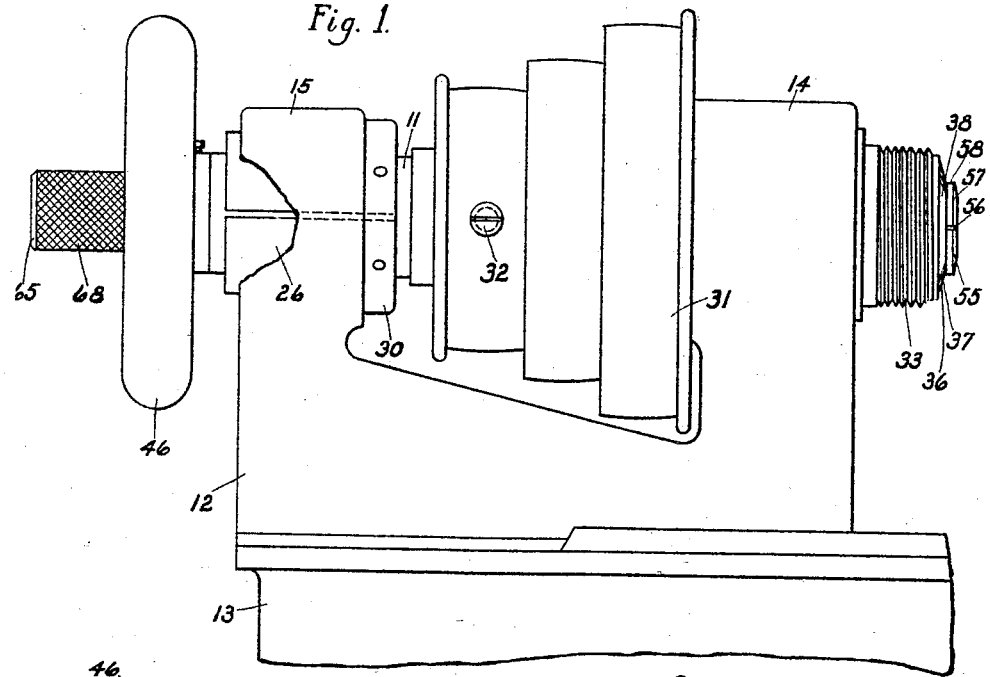
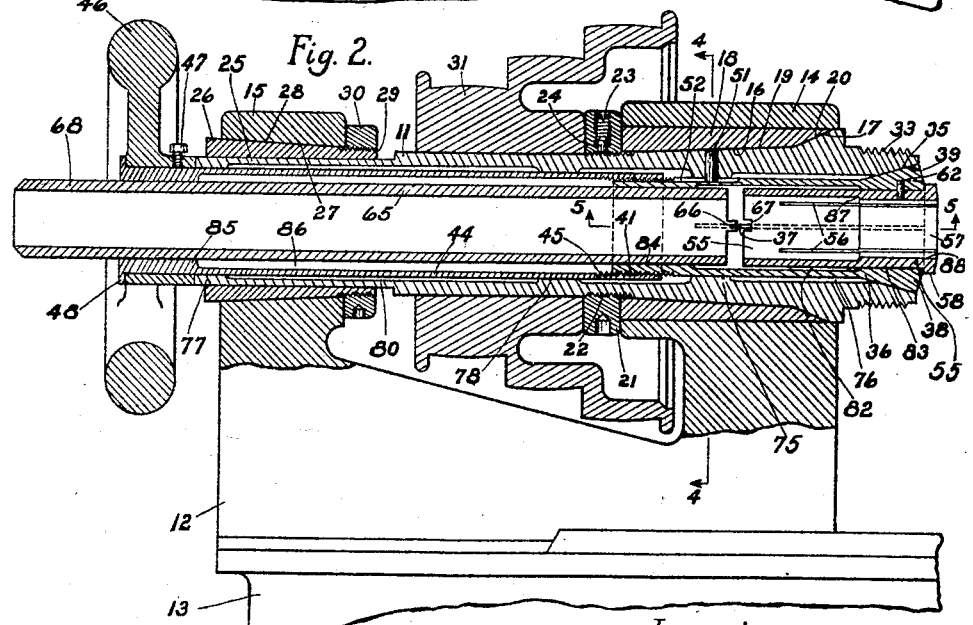
Inventor.
William F. Schumer,
by his Attorney

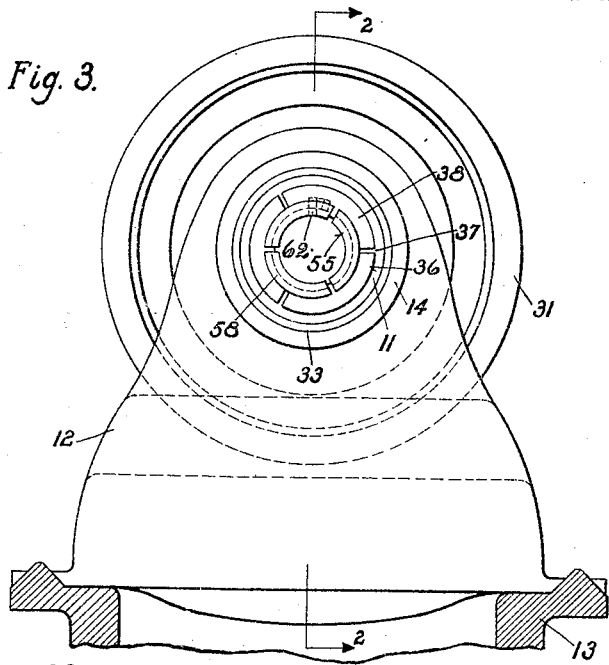
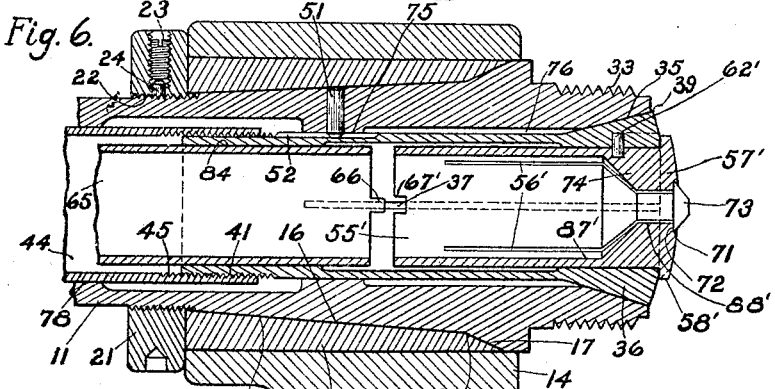
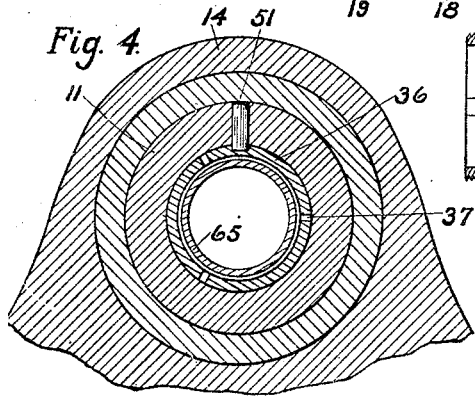
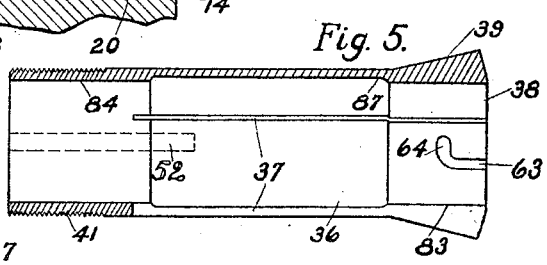

Patented Apr. 21, 1925.

1,535,048

UNITED STATES PATENT OFFICE.

WILLIAM F. SCHUMER, OF CINCINNATI, OHIO.

CHUCKING MECHANISM.

Application filed April 16, 1923. Serial No. 632,261.

*To all whom it may concern:*

Be it known that I, WILLIAM F. SCHUMER, a citizen of the United States, residing at Cincinnati, in the county of Hamilton and State of Ohio, have invented certain new and useful Improvements in Chucking Mechanism, of which the following is a specification.

My invention relates to chucking mechanism employing collets, and is exemplified in connection with a lathe, but is also employable in other relations.

It is the object of my invention to provide chucking mechanism which is of few parts and of simple construction, powerful in its action and arranged to hold articles of different kinds and materially different sizes; further, to provide novel means for operating an inner collet; further, to provide novel means for releasing the object and ejecting the same, and the invention will be further readily understood from the following description and claims, and from the drawings, in which latter:

Fig. 1 represents a side elevation of a portion of a lathe embodying my invention, partly broken away.

Fig. 2 is a central axial section of the same, taken on the line 2—2 of Fig. 3.

Fig. 3 is an end view of the same, taken from the collet end.

Fig. 4 is a cross-section of the same, taken in the plane of the line 4—4 of Fig. 2.

Fig. 5 is an axial section of the outer collet, taken in the plane of the line 5—5 of Fig. 2; and, Fig. 6 is an axial section of a detail, taken in the plane of the line 2—2 of Fig. 3, showing an inner collet of different size, and an object clamped therein.

11 represents a shell. This shell may take the form of the quill of the head-stock of a usual metal turning lathe. The head-stock is exemplified at 12, and may be suitably mounted on a suitable lathe-bed 13. The head-stock is provided with bearings 14, 15, in which the shell is journaled, preferably in such manner that wear in the bearings may be taken up from time to time. For accomplishing this latter purpose, I prefer to provide the shell adjacent to one end thereof with a slightly tapering portion 16 and a more abruptly tapering portion 17 on its outer periphery. A bushing 18 having corresponding inner peripheral faces 19, 20, is received over said outer peripheral faces 16 and 17. This bushing forms a rigid part of the bearing 14. The shell is adjustable lengthwise in the bushing to take up wear and provide a proper journal fit in the bushing, by means of a ring-nut 21 threaded over a threaded portion 22 of said shell and contacting the bearing 14. The shell is held endwise between said tapered portions and said nut. The ring-nut is fixed to the shell after adjustment by means of a set-screw 23 acting on a plug 24 in the ring-nut, to clamp said plug upon said threaded portion.

The shell is provided with a journal portion 25 adjacent its other end. A split bushing 26, which forms part of the bearing 15, is received about this journal portion. This split bushing has a tapering outer periphery 27 coacting with the tapering inner periphery 28 of the outer portion of the bearing 15. It is further provided with a threaded end 29, to which a ring-nut 30 is threaded. The ring-nut impinges the bearing 15 and is arranged to force the split bushing 26 lengthwise of the tapering periphery 28 for taking up any wear there may be between the shell and the bearing 15.

Suitable means are provided for rotating the shell, shown as a step cone pulley 31, secured to the shell by a set-screw 32.

The shell may be provided with a threaded stub 33, to which any usual holding plate or face plate used in lathe construction may be secured.

One end of the shell is provided with an inner tapering annular face 35. An outer collet 36 is arranged to be received in the shell, being provided with a suitable number of slits 37, exemplified as three, such slits forming clamping jaws 38. The outer end of this outer collet is provided with a tapering outer periphery 39, located on the outer ends of its jaws, which coacts with the tapering inner periphery 35 for contracting or expanding the jaws.

The inner end of this outer collet is provided with a threaded portion 41. A sleeve 44 is received in the shell and extends lengthwise thereof and is provided with a threaded portion 45, which coacts with the threaded portion 41 of the outer collet, for causing approach and separation between the tapering portion of the outer collet and the sleeve upon relative rotation between the outer collet and the sleeve.

A turning device is provided for the sleeve, shown as a hand-wheel 46, which is secured to the sleeve, as by means of a set-screw 47. The inner end of the hub of the hand-wheel abuts against the outer end of the shell, and the sleeve is provided with an annular flange 48, the hub of the hand-wheel being confined between this flange and the outer end of the shell. The inner end of a pin 51, held in the shell, is received in a slot 52 extending lengthwise of the outer collet, and prevents relative turning between the collet and the sleeve, but permits lengthwise movements between the same.

When the hand-wheel is rotated in one direction, the outer collet 36 is drawn toward the hand-wheel, causing its outer tapering face 39 to move lengthwise of the inner tapering face 35 of the shell, and thereby draw the jaws of the outer collet toward each other. When the hand-wheel is rotated in the opposite direction, separation is caused between the hand-wheel and the tapering outer portion of the outer collet, to cause endwise relieving movement between said outer and inner tapering portions, whereby the jaws of the outer collet are permitted to expand. The outer collet is preferably made of spring material so constructed that the jaws thereof normally expand when pressure thereon by the tapering inner face 35 is relieved. This relieving movement may be aided by endwise pressure on the hand-wheel to maintain contact between the inner end of the hub of the hand-wheel and the outer end of the shell. The shell may be held while the hand-wheel is being turned, as by the belt which is received about the pulley, or in other manner, to aid relative rotation between the sleeve and the shell.

An inner collet 55 is provided, comprising slits 56, of which three are shown, to form jaws 57. This inner collet is also of spring material so constructed that the jaws normally separate, with the outer periphery of the inner collet preferably cylindrical for being readily received within the outer collet. The inner collet is preferably provided with an annularly arranged flange 58 at the outer ends of the jaws.

Connection is preferably obtained between the inner collet and the outer collet to fix the telescoped collets lengthwise to each other upon rotative movement between the collets. This is shown accomplished by a bayonet pin and slot connection, in which the pin 62 thereof is passed through an endwise extending portion 63 of the bayonet slot. Upon relative turning between the collets, the pin is received in a laterally extending portion 64 of the bayonet slot, so as to hold the collets together lengthwise by contact between the pin and the walls of this laterally extending slot.

An ejector-part 65 is received in the sleeve and in the outer collet. This ejector-part is shown as a tube. Rotative connection is provided between the inner ends of the inner collet and the tube, shown as a clutch consisting of tongues 66 on one of said parts received in notches 67 in the other of said parts. The outer end of the ejector-part extends beyond the outer end of the sleeve, and is provided with a handle portion 68, shown with a knurled outer periphery, to be grasped by the hand for ready rotation of the ejector-part with relation to the sleeve.

When an inner collet is to be used in connection with the outer collet, the inner collet is pushed into the outer collet, with its bayonet pin 62 received in the bayonet slot until the flange 58 thereon substantially meets the outer end of the outer collet. The ejector-part is then moved inwardly and turned to cause coaction between its tongues 66 and the notches 67 at the inner end of the inner collet. When such coaction has taken place, the ejector-part is turned for rotating the inner collet within the outer collet and causing movement of the bayonet pin 62 into the lateral portion 64 of the bayonet slot, thereby fixing the collets relatively lengthwise.

When the inner collet is to be removed, the ejector-part is moved lengthwise for coactive relation between the rotative connecting parts between its inner end and the inner end of the inner collet, and the inner collet rotated in reverse direction for removing the bayonet pin 62 out of the lateral portion 64 of the bayonet slot and into line with the endwise extending portion 63 of said slot. A blow by the hand upon the outer end of the ejector-part inwardly will move the ejector-part inwardly so that it will push the inner collet outwardly and thereby release the inner collet from the outer collet.

The wall of the bore of the inner collet and the wall of the bore of the ejector-tube are in line with each other, so that a bar, tube or rod upon which it is desired to operate may be received through said ejector-tube and said inner collet, and be clamped by the clamping faces of said inner collet. Upon release of clamping action by the outer collet, the bar, tube or rod may be moved lengthwise in the inner collet, for operation upon a succeeding section of the bar, tube or rod, without danger of disengaging the inner collet from the outer collet, as the inner collet is held in the outer collet by the bayonet pin and slot connection.

The wall of the bore of the outer collet and the inner periphery of an inwardly extending bearing at the outer end of the sleeve, are in line with each other so that a bar, tube or rod may be received through and guided by said bearing and outer collet and be clamped by said outer collet.

If desired, the outer ends of the jaws of the inner collet may be provided with a laterally countersunk annular recess 71, forming an annular shoulder 72 for receiving and supporting an object, instanced as a frusto-conical part 73, for instance a jeweler's cluster setting, in said recess between said jaws. (See Fig. 6.) This object is clamped in said recess between the jaws upon clamping action of the outer collet upon the inner collet. Upon release of the inner collet by unclamping the outer collet, and rotating and ejecting the inner collet, the jaws of the inner collet will spread for ready release of the object 73 therefrom.

Inner collets having different sizes of spaces between the clamping jaws for clamping differently sized objects may be provided and be interchangeably employed in the outer collet. An example of one of such additional inner collets is shown at 55' in Fig. 6, the parts of this inner collet being identified by similar but primed reference numerals. The outside diameters of the various inner collets are, however, alike, for fitting into the outer collet. The thickness of the rear portions of the jaws thereof are preferably the same so as to provide proper spring movements for the jaws. The outer ends of the jaws are, however, enlarged inwardly as shown at 74, for reducing the diameter of the clamping bore of the inner collet, the inner ends of these enlargements preferably being tapered to permit insertion of a bar, tube or rod from the rear.

Each of the additional inner collets is provided with notches 67' with which the tongues 66 coact, for rotating the same within the outer collet, and with a bayonet-pin 62' for the bayonet pin and slot connection between the inner and outer collets.

The collet end of the shell is provided with an inner bearing 75 for the inner end of the outer collet which is of less diameter than the diameter of the bore of the shell, to provide an annular space 76 about the outer collet between said inner bearing and the taper face 35 for greater freedom of spreading and clamping movements of the jaws of the outer collet.

A comparatively narrow peripheral bearing 77 is also provided adjacent the other end of the shell, so that the sleeve 44 is centered by said comparatively narrow bearing at its outer end, its inner end being centered within a comparatively narrow bearing 78 about the outer collet by its threaded connection therewith. An annular relief-space 80 is thereby provided about the sleeve.

The outer collet has an inner peripheral relief section 82 for forming an outer comparatively narrow bearing 83 and an inner comparatively narrow bearing 84. The outer bearing 83 is at the outer ends of the jaws of the inner collet for effective clamping. The inner bearing 84 is a bearing for the inner end of the ejector-tube.

The sleeve is at its outer end provided with an inner peripheral bearing 85, in which the outer end of the ejector-tube has sliding and rotative engagement. An annular relief space 86 is thereby formed between the inner and outer ends of the ejector-tube and the sleeve.

The inner end of the inner collet is provided with an inner peripheral relief section 87 throughout the major portion thereof for forming inner peripheral clamping faces 88 for the outer end of the inner collet so that an object within said inner peripheral faces may be readily clamped therebetween.

Having thus fully described my invention, what I claim as new, and desire to secure by Letters Patent, is:

1. In chucking mechanism, the combination of a shell provided with an inner taper end face, an outer collet in said shell, said outer collet having an outer taper end face coacting with said inner taper end face, a sleeve in said shell telescopingly connected with said outer collet, the inner ends of said outer collet and said sleeve having threaded connection therebetween for relative endwise adjustment therebetween, means between said sleeve and said shell limiting endwise movement of said sleeve into said shell, turning means at the outer end of said sleeve outside said shell, an inner collet in said outer collet, means solely between said outer collet and said inner collet connecting said collets, and an ejector-part extending lengthwise in said outer collet and in said sleeve arranged to eject said inner collet by endwise movement of said ejector-part in said outer collet and said sleeve while maintaining said outer collet in said chucking mechaanism about said ejector-part.

2. In chucking mechanism, the combination of a shell provided with an inner taper end face, an outer collet in said shell, said outer collet having an outer taper end face coacting with said inner taper end face, a sleeve in said shell telescopingly arranged with relation to said outer collet, the inner ends of said sleeve and said outer collet having threaded connection therebetween for endwise adjustment between said sleeve and said outer collet, means between said sleeve and said shell limiting endwise movement of said sleeve into said shell, turning means at the outer end of said sleeve, an inner collet in said outer collet, securing means between said inner collet and said outer collet securing said collets together endwise by rotative movement of said inner collet, an ejector-part extending lengthwise in said outer collet and said sleeve arranged by endwise movement of said ejector-part in said outer collet and said sleeve to eject said inner collet, and means between the inner ends of said inner collet and said ejector-part for rotatively connecting said inner collet and said ejector-part.

3. In chucking mechanism, the combination of a shell provided with an inner taper end face, an outer collet in said shell, said outer collet having an outer taper end face coacting with said inner taper end face, a sleeve in said shell telescopingly arranged with relation to said outer collet, the inner ends of said sleeve and said outer collet having threaded connection therebetween for endwise adjustment between said sleeve and said outer collet, means between said sleeve and said shell limiting endwise movement of said sleeve into said shell, turning means at the outer end of said sleeve outside said shell, an inner collet in said outer collet, an ejector-part extending lengthwise in said outer collet and said sleeve arranged to eject said inner collet by endwise movement of said ejector-part in said outer collet and said sleeve, said inner collet and said outer collet having a bayonet pin and slot connection between them, and a clutch between the inner ends of said inner collet and said ejector-part whereby to turn said inner collet by said ejector-part.

4. In chucking mechanism, the combination of a shell provided with an inner taper end face, a collet in said shell, said collet having an outer taper end face coacting with said inner taper end face, a sleeve in said shell, the inner ends of said sleeve and said collet having threaded connection therebetween for relative endwise adjustment between said sleeve and said collet, means between said sleeve and said shell limiting endwise movement of said sleeve into said shell, said sleeve provided with turning means, an inner collet in said outer collet, securing means between said collets securing said collets together endwise by rotative movement of said inner collet, an ejector-tube in said sleeve, the bores of said ejector-tube and said inner collet being in axial alinement, and a clutch between the inner ends of said ejector tube and said inner collet to rotate said inner collet.

In testimony whereof, I have hereunto subscribed my name in the presence of two subscribing witnesses.

WILLIAM F. SCHUMER.

In presence of—
 EDWARD J. BRIGGS,
 DELMA WERNSING.